(12) United States Patent
Surendra

(10) Patent No.: US 10,350,949 B2
(45) Date of Patent: Jul. 16, 2019

(54) SMART TIRE PRESSURE MONITORING SYSTEM

(71) Applicant: Tymtix Technologies Pvt. Ltd., Bangalore, Karnataka (IN)

(72) Inventor: Prabu S. Surendra, Tamil Nadu (IN)

( * ) Notice: Subject to any disclaimer, the term of this patent is extended or adjusted under 35 U.S.C. 154(b) by 0 days.

(21) Appl. No.: 15/579,867

(22) PCT Filed: Apr. 15, 2016

(86) PCT No.: PCT/IB2016/052172
§ 371 (c)(1),
(2) Date: Dec. 5, 2017

(87) PCT Pub. No.: WO2016/198970
PCT Pub. Date: Dec. 15, 2016

(65) Prior Publication Data
US 2018/0178601 A1    Jun. 28, 2018

(30) Foreign Application Priority Data

Jun. 10, 2015  (IN) .......................... 2899/CHE/2015

(51) Int. Cl.
*B60C 23/00* (2006.01)
*G07C 5/00* (2006.01)
(Continued)

(52) U.S. Cl.
CPC ...... *B60C 23/0479* (2013.01); *B60C 23/0471* (2013.01); *B60C 23/0488* (2013.01); *G07C 5/008* (2013.01); *G07C 5/0816* (2013.01)

(58) Field of Classification Search
CPC ......... B60C 23/00; B60C 23/02; B60C 23/04; B60C 23/0433; B60C 23/0435; G07C 5/00; G07C 5/008; G07C 5/0816
See application file for complete search history.

(56) References Cited

U.S. PATENT DOCUMENTS

| 6,825,758 B1 | 11/2004 | Laitsaari |
| 2002/0130771 A1 | 9/2002 | Osborne et al. |

(Continued)

FOREIGN PATENT DOCUMENTS

| CN | 202794981 U | 3/2013 |
| TW | 200929085 A | 7/2009 |

OTHER PUBLICATIONS

International Search Report and Written Opinion for International Patent Application No. PCT/IB2016/052172, dated Sep. 2, 2016, 9 pages.

(Continued)

*Primary Examiner* — Yonel Beaulieu

(57) ABSTRACT

Methods, systems, and computer program products for a wireless portable tire monitoring system are provided. According to one aspect, wireless portable tire monitoring system includes a portable monitor that receives sensor information from one or more tire-mounted sensors, each sensor being associated with a tire, and each tire being associated with a vehicle, and monitors tire status. Multiple vehicles may be monitored from the same portable monitor, and tires can be dynamically associated with or disassociated from a particular vehicle. Tire status may be displayed to the user in a manner that provides a graphic association between the tire status and the vehicle to which the tire is associated, including showing the location of the tire on the vehicle. The system may asynchronously alert the user if threshold conditions, such as low tire pressure, are detected.

15 Claims, 13 Drawing Sheets

(51) Int. Cl.
  *B60C 23/04* (2006.01)
  *G07C 5/08* (2006.01)

(56) References Cited

U.S. PATENT DOCUMENTS

| | | | |
|---|---|---|---|
| 2005/0270148 A1* | 12/2005 | Modawell | B60C 23/009 340/445 |
| 2006/0253217 A1 | 11/2006 | Moulds et al. | |
| 2008/0065290 A1* | 3/2008 | Breed | G01L 17/00 701/31.4 |
| 2008/0164988 A1 | 7/2008 | DeKeuster et al. | |
| 2012/0176233 A1 | 7/2012 | Petrucelli et al. | |

OTHER PUBLICATIONS

International Preliminary Report on Patentability for International Patent Application No. PCT/IB2016/052172, dated Dec. 21, 2017, 7 pages.
Extended European Search Report for European Patent Application No. 16806966.4, dated Dec. 13, 2018, 7 pages.
First Office Action for Chinese Patent Application No. 201680033935.7, dated Mar. 4, 2019, 13 pages.

\* cited by examiner

SMART TIRE PRESSURE MONITORING SYSTEM

RELATED APPLICATIONS

This application is a 35 U.S.C. § 371 national phase filing of International Application No. PCT/IB2016/052172, filed Apr. 15, 2016, which claims the benefit of Indian Patent Application Serial Number 2899/CHE/2015 for SMART TIRE PRESSURE MONITORING SYSTEM, filed Jun. 10, 2015, the disclosures of which are hereby incorporated herein by reference in their entireties.

TECHNICAL FIELD

The present disclosure relates to reading and monitoring of vehicle tire pressure and temperature on a smart device such as smart phone or a smart tablet.

BACKGROUND OF THE INVENTION

Given the importance of tire pressure with respect to road safety, there are several solutions that exist today to assist vehicle owners to keep their vehicle tires inflated properly. However, conventional tire pressure reading and monitoring solutions suffer from one or more of the following limitations:
  vehicle owners must be physically close to the vehicle and sometimes with ignition key turned on for the pressure value to be displayed on the vehicle's dashboard screen;
  no asynchronous notification mechanism is present in case tire pressure falls below critical level or a flat tire is detected;
  there is no prior art solution that allows a single user to monitor, from a centralized location, all the vehicles that user owns; and
  in case of trucks where trailers are added and removed dynamically, current tire pressure monitoring solutions don't support monitoring of tires that are dynamically added/removed.

SUMMARY OF THE INVENTION

The present disclosure provides systems, methods, and devices for smart tire monitoring. All of the above limitations of the prior art are overcome by the subject matter of the instant application, which provides a system comprising tire monitoring hardware to read the pressure values of tires and a companion mobile application which displays the pressure values as well as provides other features.

In one embodiment, the tire monitoring hardware includes a pressure sensor, a temperature sensor, other types of sensors, or some combination of the above. In one embodiment, the tire monitoring hardware is placed inside the tire. In one embodiment, the tire monitoring hardware is anchored to the air stem valve. Alternatively, the tire monitoring hardware may be anchored to the tire, rim, hub, or other wheel component.

In one embodiment, the companion application is configured to get the sensor readings of a vehicle from the tires that have the hardware installed. In one embodiment, the application receives pressure readings from each tire. In one embodiment, if the pressure value falls below minimum threshold, the hardware may send an asynchronous notification to the companion application which in turn may display an alert on the mobile device.

In contrast to conventional tire monitoring systems, which monitor tire pressure for a single vehicle, methods and systems disclosed herein may be used to monitor multiple vehicles. For a given vehicle, a user can add and remove any number of tires dynamically. The mobile application takes care of mapping the appropriate hardware sensors to the corresponding vehicle tires.

According to one aspect of the subject matter described herein, a method of operation of a wireless portable tire monitoring system includes, at a wireless portable tire monitor having at least one processor: receiving sensor information from one or more tire-mounted sensors, each sensor being associated with a tire, and each tire being associated with a vehicle, and monitoring a status of at least one of the one or more tires. In one embodiment, sensor information is received from a plurality of vehicles. In one embodiment, each tire can be dynamically associated with or disassociated from a particular vehicle. In one embodiment, receiving sensor information comprises receiving an inflation pressure of the tire, a temperature of the tire, an indication of rotation of the tire, and/or an indication of vibration of the tire. In one embodiment, monitoring a status comprises making the tire status available for viewing by a user of the wireless portable tire monitoring system. In one embodiment, making the tire status available for viewing by a user of the wireless portable tire monitoring system comprises providing a graphic association between the tire status and the vehicle to which the tire is associated. In one embodiment, providing a graphic association between the tire status and the vehicle to which the tire is associated comprises graphically representing the tire's location or position on or relative to the vehicle.

In one embodiment, monitoring a status of the tire comprises determining whether the sensor information indicates a threshold condition, and, upon a determination that the sensor information indicates a threshold condition, performing an action. In one embodiment, a threshold condition comprises a tire pressure that is above or below a pressure threshold, a tire temperature that is above or below a temperature threshold, a tire rotation that is above or below a rotation rate threshold, and/or a tire vibration that is above or below a vibration threshold. In one embodiment, performing an action comprises providing an alert or notification to a user of the wireless portable tire monitoring system. In one embodiment, at least one of the receiving and monitoring steps is performed on a smart device, a mobile phone, or a tablet, hand-held, or portable computer.

According to another aspect of the subject matter described herein, a wireless portable tire monitor comprises a wireless transceiver, a display device, one or more processors, and memory storing instructions executable by the one or more processors. The wireless portable tire monitor is operable to receive sensor information from one or more tire-mounted sensors, each sensor being associated with a tire, and each tire being associated with a vehicle, and monitor a status of at least one of the one or more tires. In one embodiment, sensor information is received from a plurality of vehicles. In one embodiment, each tire can be dynamically associated with or disassociated from a particular vehicle. In one embodiment, receiving sensor information comprises receiving an inflation pressure of the tire, a temperature of the tire, an indication of rotation of the tire, and/or an indication of vibration of the tire. In one embodiment, monitoring a status comprises making the tire status available for viewing by a user of the wireless portable tire monitoring system. In one embodiment, making the tire status available for viewing by a user of the wireless portable tire monitoring system comprises providing a graphic association between the tire status and the vehicle to which the tire is associated. In one embodiment, providing a graphic association between the tire status and the vehicle to which the tire is associated comprises graphically representing the tire's location or position on or relative to the vehicle.

In one embodiment, monitoring a status of the tire comprises determining whether the sensor information indicates a threshold condition, and, upon a determination that the sensor information indicates a threshold condition, performing an action. In one embodiment, a threshold condition comprises a tire pressure that is above or below a pressure threshold, a tire temperature that is above or below a temperature threshold, a tire rotation that is above or below a rotation rate threshold, and/or a tire vibration that is above or below a vibration threshold. In one embodiment, performing an action comprises providing an alert or notification to a user of the wireless portable tire monitoring system. In one embodiment, at least one of the receiving and monitoring steps is performed on a smart device, a mobile phone, or a tablet, hand-held, or portable computer.

According to another aspect of the subject matter described herein, a wireless portable tire monitor is adapted to receive sensor information from one or more tire-mounted sensors, each sensor being associated with a tire, and each tire being associated with a vehicle, and monitor a status of the one or more tires. In one embodiment, the wireless portable tire monitor is adapted to perform a method of any of the embodiments described herein.

According to another aspect of the subject matter described herein, a wireless portable tire monitor comprises means for receiving sensor information from one or more tire-mounted sensors, each sensor being associated with a tire, and each tire being associated with a vehicle, and means for monitoring a status of at least one of the one or more tires.

According to another aspect of the subject matter described herein, a wireless portable tire monitor comprises a first receiving module operable to receive sensor information from one or more tire-mounted sensors, each sensor being associated with a tire, and each tire being associated with a vehicle, and a second monitoring module operable to monitor a status of at least one of the one or more tires.

According to another aspect of the subject matter described herein, a non-transitory computer readable medium storing software instructions that when executed by one or more processors of a wireless portable tire monitor cause the wireless portable tire monitor to receive sensor information from one or more tire-mounted sensors, each sensor being associated with a tire, and each tire being associated with a vehicle, and monitor a status of at least one of the one or more tires is provided.

According to another aspect of the subject matter described herein, a computer program comprising instructions which, when executed by at least one processor, cause the at least one processor to carry out the method according to any one of the embodiments described herein is provided.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
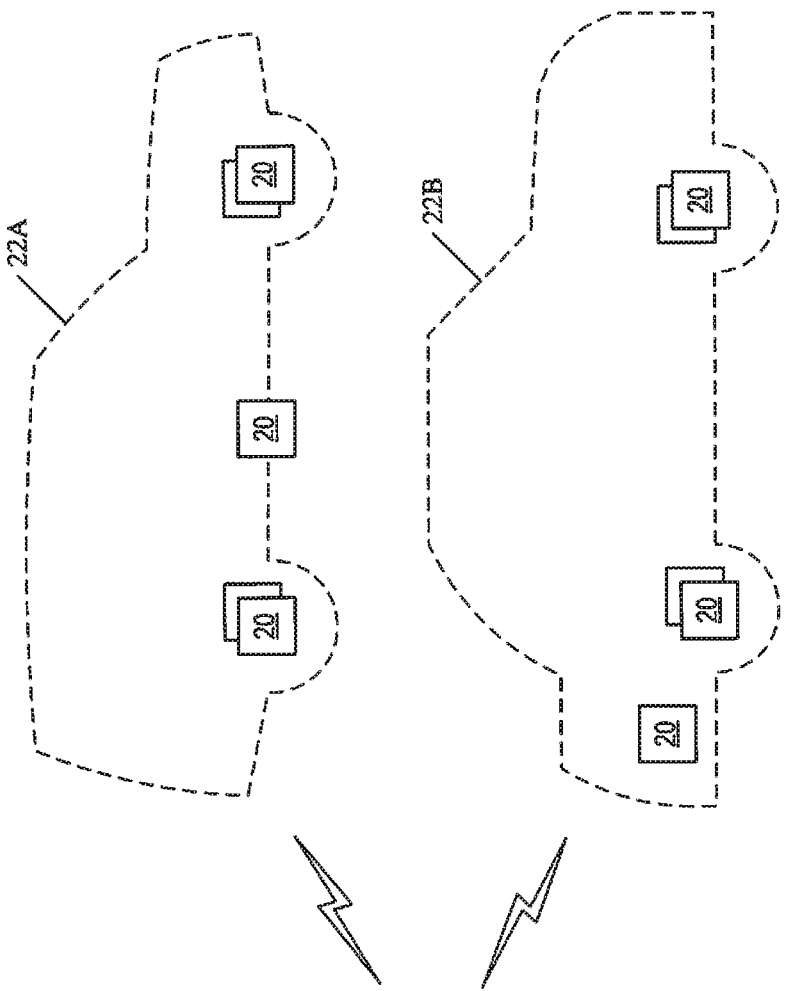
FIG. 1 illustrates an exemplary smart tire monitoring system according to an embodiment of the subject matter described herein.
Figure 1:
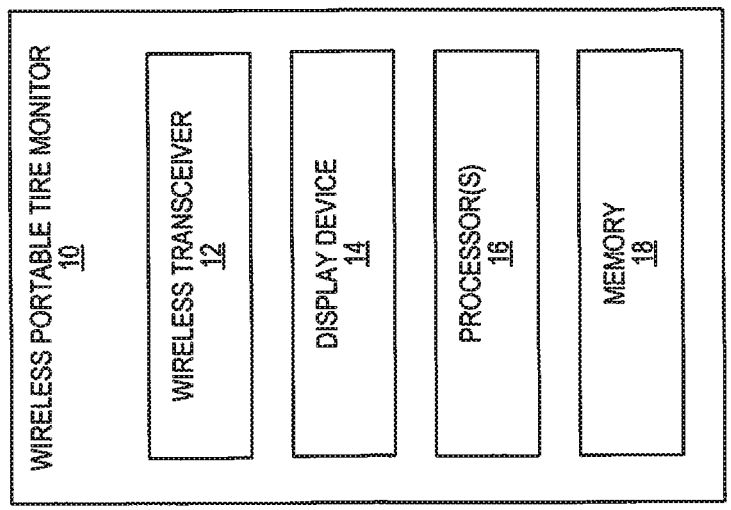

FIG. 1 illustrates an exemplary smart tire monitoring system according to an embodiment of the subject matter described herein. In the embodiment illustrated in FIG. 1, the smart tire monitoring system includes a wireless portable tire monitor 10 that includes a wireless transceiver 12, a display device 14, one or more processors 16, and a memory 18 for storing instructions executable by the one or more processors 16. For brevity of description, the wireless portable tire monitor 10 may herein be referred to as "tire monitor 10" or "monitor 10." The wireless portable tire monitor 10 receives sensor information from one or more tire mounted sensors 20, each of the sensors 20 being associated with a tire of a vehicle, and uses that sensor information to monitor a status of the tire. A group or groups of sensors 20 may herein be collectively referred to as "the sensors 20" or individually as "the sensor 20." Groups of sensors may be associated with a particular vehicle. In the embodiment illustrated in FIG. 1, five tire sensors 20 are associated with a first vehicle 22A and five other tire sensors 20 are associated with a second vehicle 22B. The vehicles 22A and 22B may herein be collectively referred to as "the vehicles 22" and one of the vehicles may be referred to as "the vehicle 22". The sensor information received by the tire monitor 10 may be an inflation pressure of the tire, a temperature of the tire, an indication of rotation of the tire, and indication of vibration of the tire, some other type of information about the tire, and/or combinations thereof. Although FIG. 1 shows just two vehicles, the system is not so limited. As will be described in more detail below, the smart tire monitoring methods and systems described herein support any number of vehicles, and support vehicles with any number of tires. Specifically, the systems and methods described herein give a user the ability to track/monitor multiple vehicles from one location and/or with one handheld device (i.e., as opposed to relying upon vehicle-based systems) and also have the flexibility to dynamically associate a particular tire (and its sensor) to any vehicle or remove such association.

In one embodiment, the tire monitor 10 makes the tire status available for viewing by a user of the wireless portable monitoring system. In one embodiment, the tire monitor 10 may present to the user a graphic display of tire pressure, temperature, etc., via the display device 14, which may be a screen of a mobile phone, for example. In one embodiment, the tire monitor 10 provides a graphic association between the tire status and the vehicle to which the tire is associated. For example, the tire monitor 10 may graphically represent a tire's location or position on a vehicle (such as for mounted tires) or relative to the vehicle (such as for spare tires). An example of such a graphic representation will be described in FIG. 2, below.

In one embodiment, monitoring a tire based on received sensor information may include determining whether the sensor information indicates a threshold condition, and, upon a determination that the sensor information indicates a threshold condition, performing an action. Examples of threshold conditions include, but are not limited to, detecting that a tire pressure is above or below a pressure threshold, detecting that a tire temperature is above or below a temperature threshold, detecting that a tire rotation is above or below a rotation rate threshold, detecting that a tire vibration is above or below a vibration threshold, detecting some other threshold condition, and/or combinations of the above.

In one embodiment, the tire monitor 10 may respond to detection of a threshold condition in a number of ways, including, but not limited to, providing an alert or notification to a user. In one embodiment, different thresholds may have or be assigned different priority levels. For example, if a tire pressure is slightly below a target inflation pressure, the tire monitor 10 may display a warning to the user, but if a tire pressure is so low that the tire is considered a flat tire, the tire monitor 10 may display an alert and sound a warning tone. In one embodiment, low priority warnings or status messages may be presented to the user only if the user has the application in the foreground and/or is querying the particular vehicle, while alerts and high priority messages may be displayed to the user asynchronously, e.g., even when the user is not actively querying a particular vehicle and perhaps even if the user does not have the tire monitoring application in the foreground.

Figure 2:
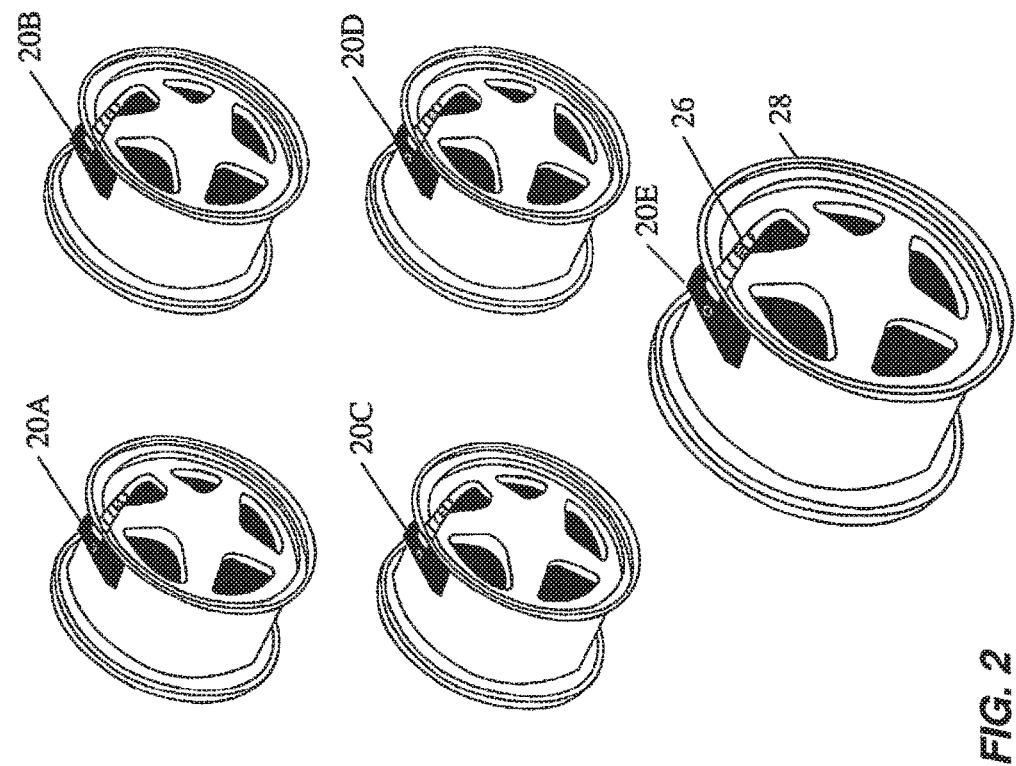
FIG. 2 illustrates an exemplary smart tire monitoring system according to another embodiment of the subject matter described herein.
Figure 2:
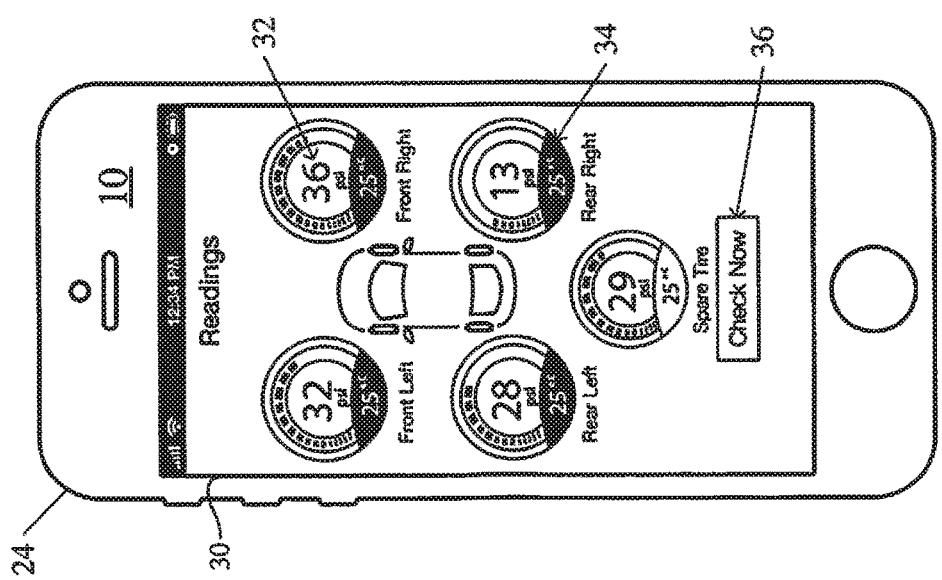

In one embodiment, the tire monitor 10 may be an application executing on a smart device, a mobile phone, or a tablet, hand-held, or portable computer, or other computing platform. An example of such an embodiment is illustrated in FIG. 2. In alternative embodiments, the functions performed by the smart tire monitoring systems and methods described herein may be executed on custom or dedicated hardware, and may be handled by one or more programs or applications that execute on one or more processors, dedicated logic, or other processing means located on a smart device, located on a remote execution platform separate from the smart device, or some combination of the two.

FIG. 2 illustrates an exemplary smart tire monitoring system according to another embodiment of the subject matter described herein. In the embodiment illustrated in FIG. 2, the tire monitor 10 is an application running on a smart phone 24 that wirelessly communicates with the tire sensor 20A, which is mounted to the left front wheel of a passenger car, the sensor 20B, which is mounted to the right front wheel of the passenger car, the sensor 20C, which is mounted to the left rear wheel of the passenger car, the sensor 20D, which is mounted to the right rear wheel of the passenger car, and the sensor 20E, which is mounted to the spare tire of the passenger car. The terms "front," "rear," "left," and "right" are from the perspective of a person seated in a driving seat of the vehicle. In the embodiment illustrated in FIG. 2, each sensor 20 is anchored to an air stem value 26 and is seated under a tire rim 28, inside the pressurized portion of the tire. In alternative embodiments, the sensor 20 may be mounted to the tire rim 28 away from the air stem valve 26 or may be mounted to the tire itself.

In the embodiment illustrated in FIG. 2, the tire monitor 10 communicates with the sensors 20 and displays information about each tire to the user of the monitor 10. In the embodiment illustrated in FIG. 2, the tire monitor 10 includes a Readings screen 30, which displays tire pressure for each of the tires on a vehicle. In the embodiment illustrated in FIG. 2, the tire pressure is displayed in Pounds per Square Inch (P.S.I.), but other units of pressure may be used. In the embodiment illustrated in FIG. 2, the information for each tire is represented as an image or information graphic showing a tire pressure 32 both as a digital value (e.g., 36 P.S.I.) and a graph or dial indicating pressure and a tire temperature 34 (e.g., 25° C.). In the embodiment illustrated in FIG. 2, temperature is displayed in degrees Celsius, but other units, such as Fahrenheit, may be used. In one embodiment, the tire monitor 10 may poll or issue requests to the sensors for data, which the user may initiate using a Check Now button 36. In one embodiment, the tire monitor 10 may receive data from the sensors without having issued a specific request for that data.

In one embodiment, the Readings screen 30 displays the information in a manner that mimics or represents the physical locations of each tire and sensor and a particular vehicle. In the embodiment illustrated in FIG. 1, for example, the sensor 20 of the front left tire is represented by the information graphic in the upper left portion of the Readings screen 30; the sensor 20 of the front right tire is represented by the information graphic in the upper right portion of the Readings screen 30; the sensor 20 of the rear left tire is represented by the information graphic in the middle left portion of the Readings screen 30; the sensor 20 of the rear right tire is represented by the information graphic in the middle right portion of the Readings screen 30; and the sensor 20 of the spare tire is represented by the information graphic in the bottom portion of the Readings screen 30.

As will be described in more detail below, the monitor 10 has the ability to map specific tire sensors to information graphics in specific places on a display, which greatly enhances the user's comprehension of the status of a particular vehicle or fleet of vehicles. For example, it can easily be seen from the Readings screen 30 that the rear right tire has very low air pressure—only 13 P.S.I. This is also shown graphically: the pressure dial representing the rear right tire pressure shows an arc of only about 80 degrees, as opposed to the arcs of between about 180 and 270 degrees for the other tires. In one embodiment, the sensor 20 may be able to detect whether a tire is rotating or not, and indicate so on the display. For example, in the embodiment illustrated in FIG. 2, the sensor 20 of the spare tire may detect that the tire is not rotating. This is shown graphically in the Readings screen 30: in the information graphic for the spare tire, the tire temperature display background is a different or lighter color than the equivalent backgrounds for the tires in use. In one embodiment, the user can customize or set the background color or other attributes for each tire sensor.

FIGS. 3A through 3F graphically illustrate the steps involved in adding a new vehicle and configuring its tires to be monitored according to an embodiment of the subject matter described herein.

Figure 3C:
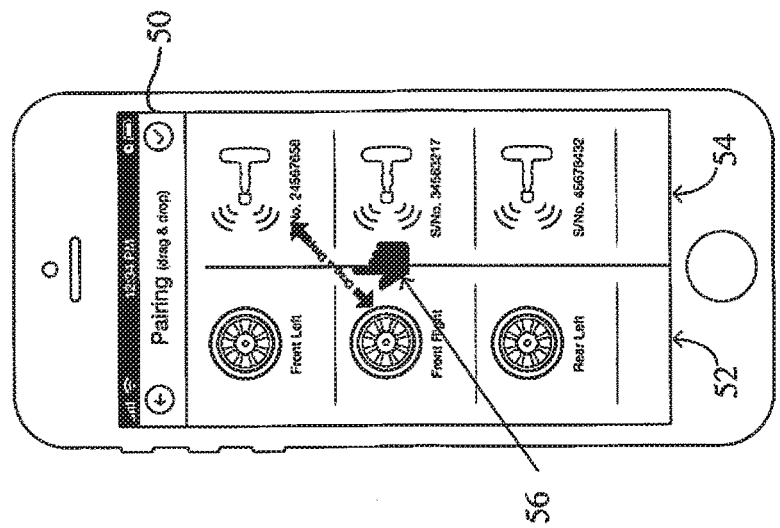
FIGS. 3A through 3F are images of an exemplary user interface that graphically illustrate the steps involved in adding a new vehicle and configuring its tires to be monitored according to an embodiment of the subject matter described herein.
Figure 3B:
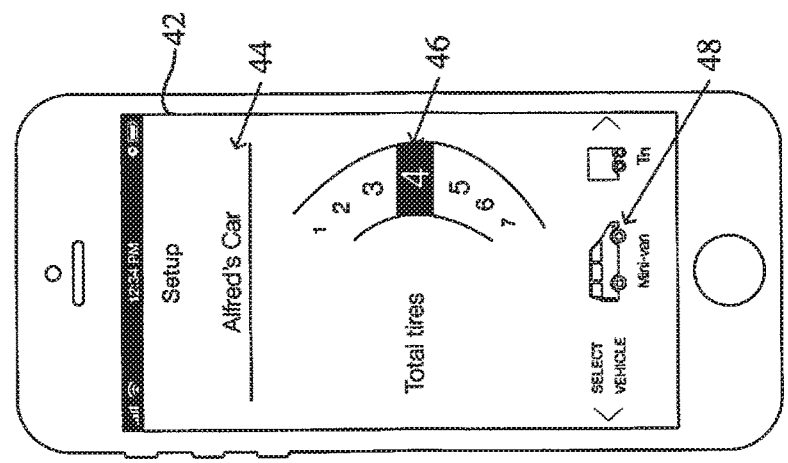
Figure 3A:
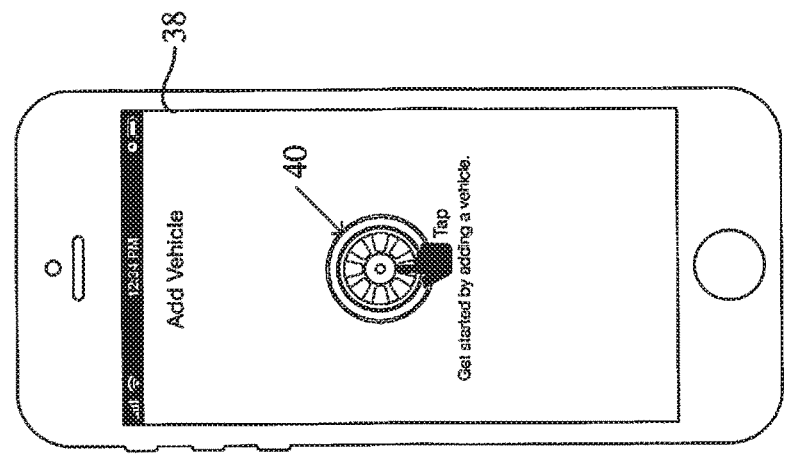

In the embodiment illustrated in FIG. 3A, a new vehicle is added from a home screen 38 by tapping an Add Vehicle button 40. This will take the user to a Setup screen, an example of which is shown in FIG. 3B.

In the embodiment illustrated in FIG. 3B, a Setup screen 42 allows the user to enter information about the vehicle, such as a vehicle name 44, a total number of tires on that vehicle 46 and a type of the vehicle 48. This will be followed by a Pairing screen, an example of which is shown in FIG. 3C.

In the embodiment illustrated in FIG. 3C, a Pairing screen 50 allows a user to pair tires (identified by location or other identifier) to sensors (identified by sensor number, serial number, or other identifier). In the embodiment illustrated in FIG. 3C, the number of tires shown is based on the number of tires configured on the previous screen. The tire sensor list may be populated automatically, e.g., the tire monitor 10 detects nearby sensors using Bluetooth or other wireless protocol, or manually, e.g., the user enters the sensor identifying information via a keyboard or text input. In the embodiment illustrated in FIG. 3C, the tires are displayed in a left column 52 and the sensors are displayed in a right column 54. In this embodiment, associating a tire with a sensor requires a drag and drop gesture 56. At the time of association, settings for the tire may be assigned using a Tire Threshold screen, an example of which is shown in FIG. 3D.

Figure 3F:
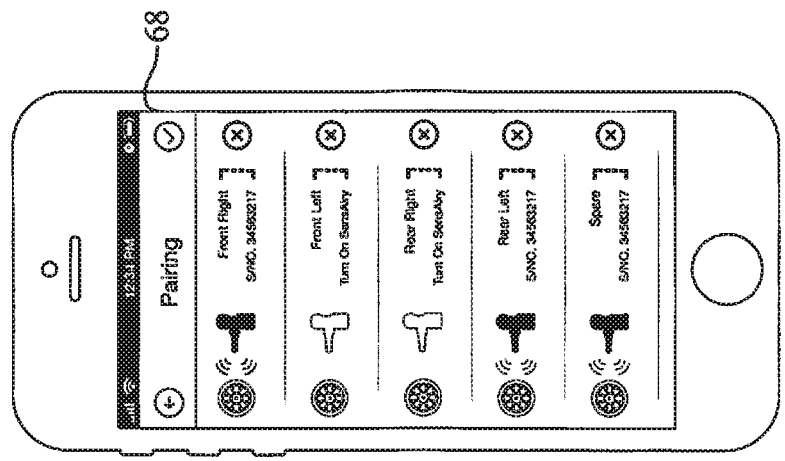
Figure 3E:
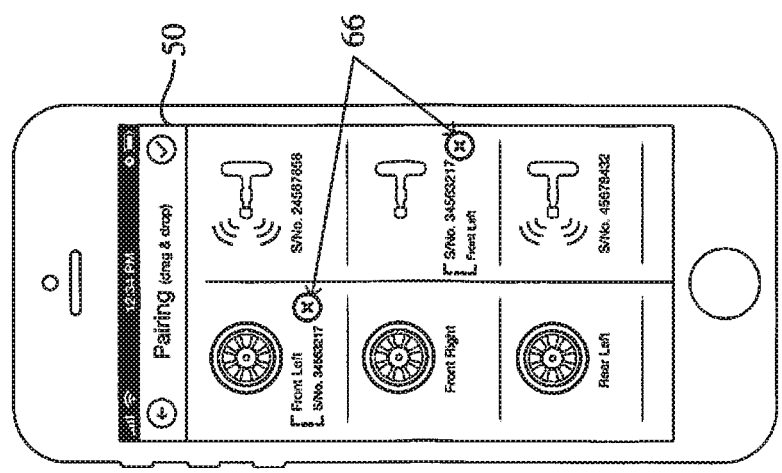
Figure 3D:
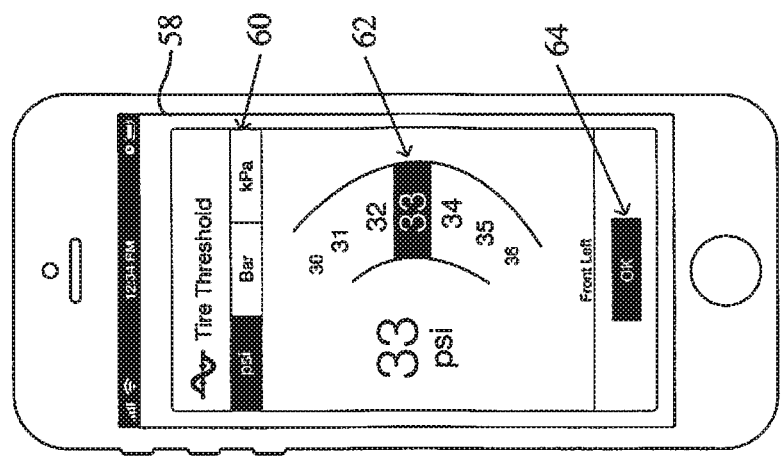

In the embodiment illustrated in FIG. 3D, the Tire Threshold screen 58 provides controls by which the user can select the units of measurement for pressure (e.g., pounds per square inch (PSI), bars, or kilo-Pascals) 60 and/or set a recommended tire pressure 62 and by which the user can assign a name 64 to the tire. Once the association is made, the user may return to the Pairing screen 50, an example of which is shown in FIG. 3E.

In the embodiment illustrated in FIG. 3E, the user may use the Pairing screen 50 to "un-pair" a tire and sensor, e.g., to destroy the association between the two, if required. In the embodiment illustrated in FIG. 3E, the user may tap on a cancel icon 66, which is displayed on both the wheel icon in the left column and the corresponding sensor icon in the right column. In the example illustrated in FIG. 3E, tapping the cancel icon 66 will destroy an existing association between the front left wheel and the current front left sensor.

In the embodiment illustrated in FIG. 3F, the tire monitor 10 may display a Pairing screen 68 showing the results of an auto-pairing operation, which the user may manually adjust or override. Once all tires are configured, the user will be presented with a My Vehicles screen, an example of which is shown in FIG. 4A.

Figure 4C:
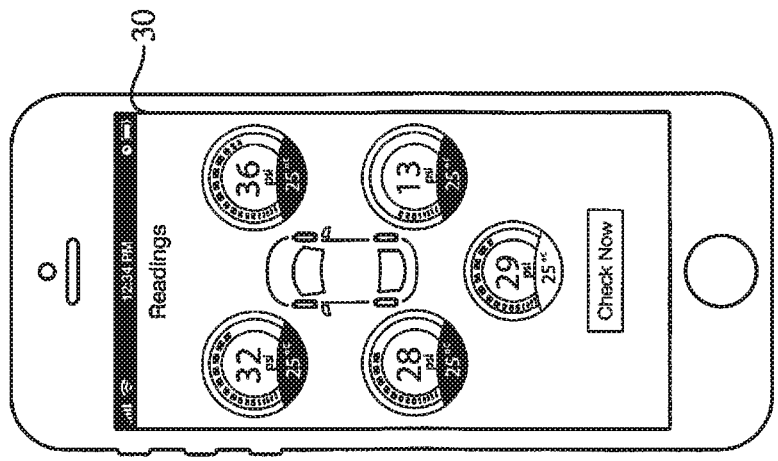
FIGS. 4A through 4C are images of an exemplary user interface to monitor the tire pressure of more than one vehicle according to an embodiment of the subject matter described herein.
Figure 4B:
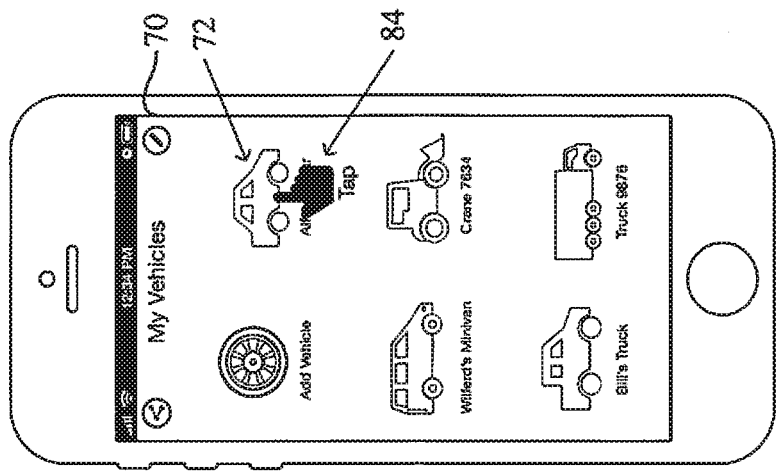
Figure 4A:
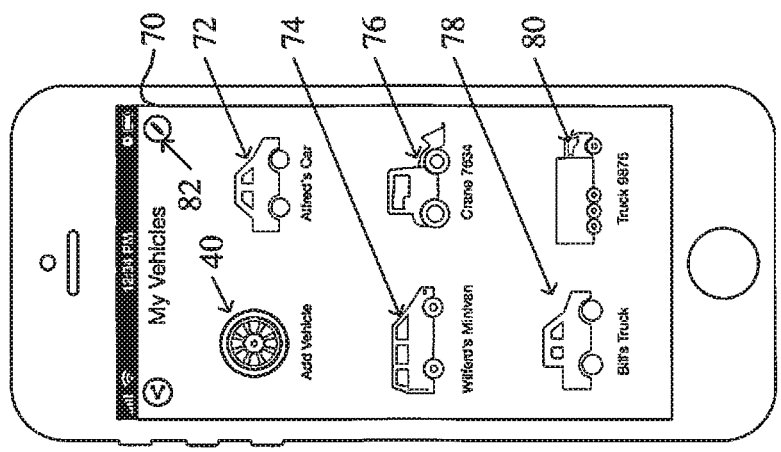

In the embodiment illustrated in FIG. 4A a My Vehicles screen 70 lists some or all of the vehicles that the user has configured, e.g. via the Setup screen 42 shown in FIG. 3B. In the embodiment illustrated in FIG. 4A, the user has configured five vehicles:

a passenger car 72, named "Alfred's Car";
a minivan 74, named "Wilferd's Minivan";
a construction vehicle 76, named "Crane 7634";
a pickup truck 78, named "Bill's Truck"; and
a tractor-trailer truck 80, named "Truck 9876."

These examples are not intended to be limiting: icons for other forms of vehicles may be provided or used. The user may use the Add Vehicle button 40, as illustrated in FIG. 3A, to configure additional vehicles. An Edit button 82 allows the user to change or modify the vehicle configuration, e.g., by returning to the Setup screen 42 illustrated in FIG. 3B. Some or all of the setup sequence illustrated in FIGS. 3B through 3F may be repeated.

Although FIG. 4A shows only five vehicles, the systems and methods described herein are not so limited: the user may configure any number of vehicles. In one embodiment, for example, the My Vehicles screen 70 may be horizontally and/or vertically scrollable so that other configured vehicles may be made visible. In one embodiment, sets of vehicles may be arranged hierarchically into groups. For example, a user may create one group of vehicles that includes construction vehicles at one construction site, and another group of vehicles that include construction vehicles at another construction site. Likewise, a user may create one group containing his or her family's vehicles and another group containing corporate vehicles. These groups may have representative icons, which, when tapped by the user, changes the screen to a view of the vehicles in that group. FIG. 4A illustrates the point that the user of the tire monitor 10 can select a vehicle icon that graphically and easily conveys the type of vehicle being monitored, and that the user can select a name or identifier of his or her choosing. From these screens, the user may display information for one or more vehicles.

As illustrated in FIG. 4B, the user may simply make a tapping gesture 84 on the vehicle icon for passenger car 72. Doing so presents the vehicle information for passenger car 72, as shown in FIG. 4C.

In the embodiment illustrated in FIG. 4C, the Readings screen 30 of the selected vehicle is again displayed. In one embodiment, the user may use the Readings screen 30 to add or remove tires, add, delete, or change associations between tires and sensors, and so on. Unlike conventional tire monitoring systems, the system 10 has flexibility to modify the settings dynamically. Any number of tires may be configured for a vehicle, which means that the systems and methods described herein are suitable for a wide range of vehicle types, from unicycles to tractor-trailer trucks or other multi-wheeled vehicles.

FIGS. 5A through 5D are images of an exemplary user interface that illustrate an application notification feature according to an embodiment of the subject matter described herein.

Figure 5B:
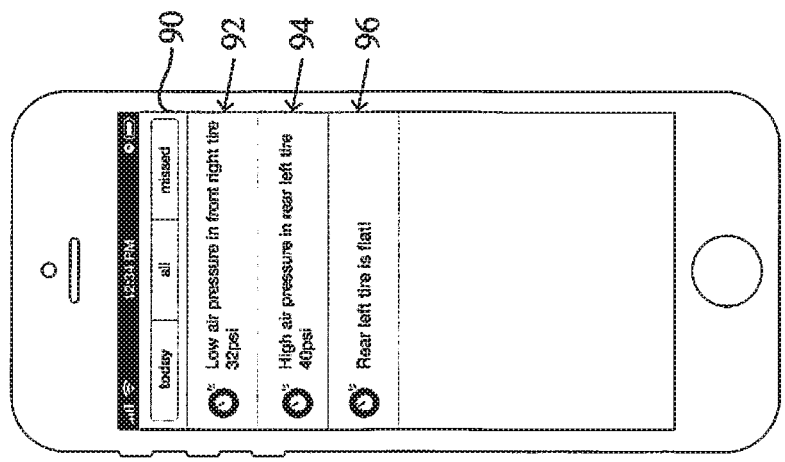
FIGS. 5A through 5D are images of an exemplary user interface that illustrate an application notification feature according to an embodiment of the subject matter described herein.
Figure 5A:
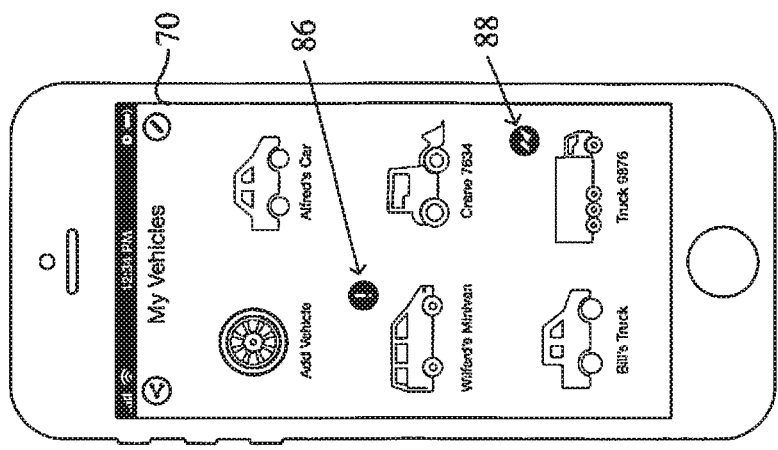

In the embodiment illustrated in FIG. 5A, the My Vehicles screen 70 displays notification icons 86 and 88 next to their respective vehicles. In one embodiment, the notification icon 86 is used to indicate a detected condition that requires attention by the user, while the notification icon 88 indicates loss of communication with one or more previously configured sensors.

FIG. 5B illustrates another type of notification that may be displayed. In the embodiment illustrated in FIG. 5B, a dedicated notifications screen 90 displays a number of notification messages, including:

- A low pressure notification 92, indicating that the front right tire pressure is 32 PSI (below the 33 PSI threshold value, in this example);
- A high pressure notification 94, indicating that the rear left tire pressure is 40 PSI; and
- A flat tire notification 96, indicating that the rear left tire is flat (or has such a low tire pressure as to be effectively flat).

Other types of notifications are contemplated. In one embodiment, these notifications may be asynchronous, e.g., displayed without requiring user intervention or request. In one embodiment, different notifications may be assigned different levels of urgency. For example, in one embodiment, a low pressure notification may be displayed only when the user has selected that vehicle within the smart tire pressure monitoring application, while a flat tire notification may be displayed whenever the user's device is within range of the sensors, whether or not the user has selected that vehicle for review (and perhaps whether or not the application is currently in the foreground). Other notification configurations are also contemplated.

Figure 5D:
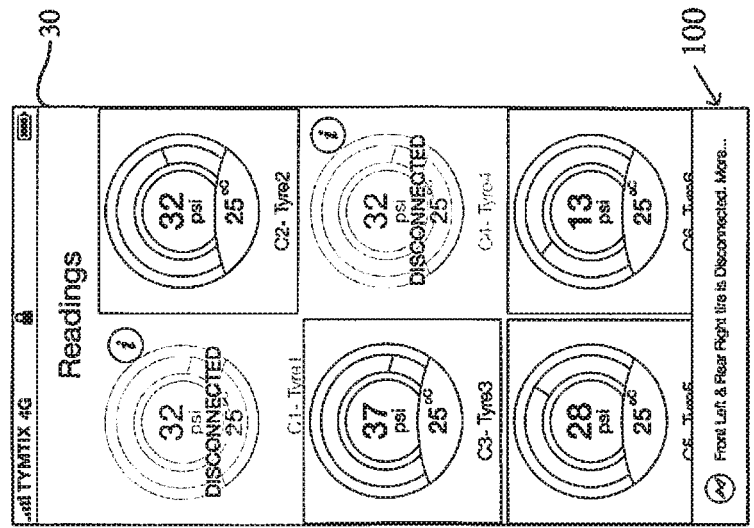
Figure 5C:
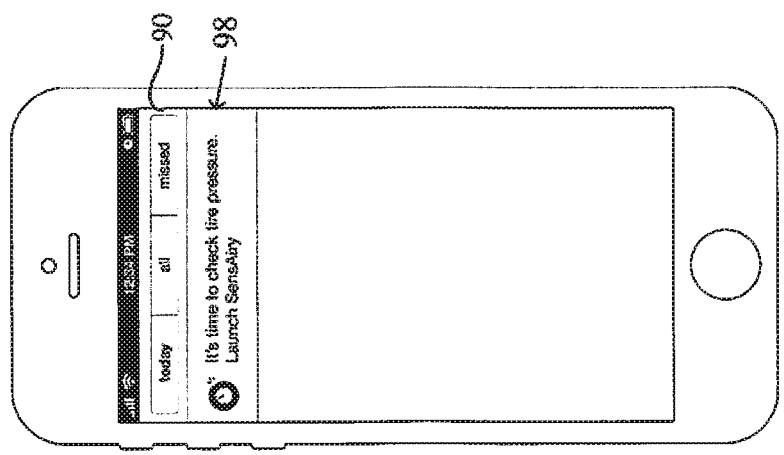

FIG. 5C illustrates another type of notification that may be displayed according to an embodiment of the subject matter described herein. In the embodiment illustrated in FIG. 5C, the notifications screen 90 displays a message 98 to remind the user that it is time to check tire pressure. In one embodiment, this message may be generated upon a trigger condition, such as lack of communication with any sensor on that particular vehicle for more than a threshold amount of time, for example.

FIG. 5D illustrates another type of notification that may be displayed according to an embodiment of the subject matter described herein. In one embodiment, the Readings screen 30 may include indicators of status of the sensors in addition to status of the tire. In the embodiment illustrated in FIG. 5D, for example, the Readings screen 30 may notify the user when a sensor is disconnected or unreadable by the tire monitor 10. In FIG. 5D, the sensors for Tyre1 and Tyre4 are disconnected. In one embodiment, an explanatory message 100 may also be displayed. In the embodiment illustrated in FIG. 5D, for example, at the bottom of the display an explanation message "Front Left & Rear Right tire is Disconnected" is shown.

Figure 6:
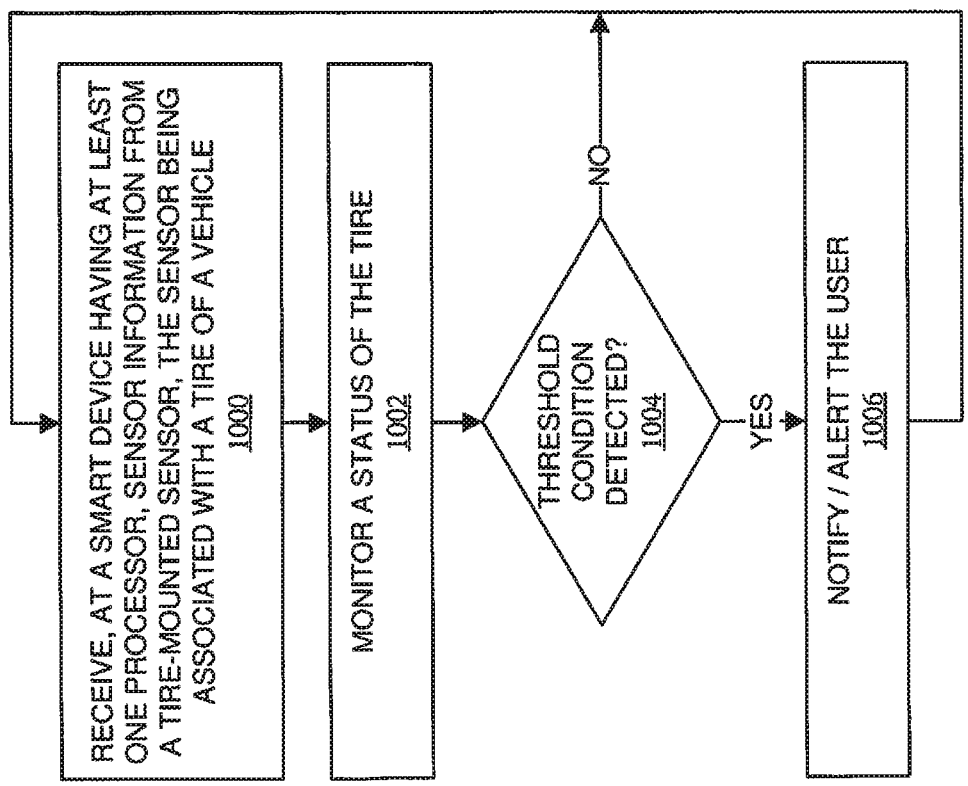
FIG. 6 is a flow chart illustrating an exemplary process for smart tire monitoring according to another embodiment of the subject matter described herein.

FIG. 6 is a flow chart illustrating an exemplary process for smart tire monitoring according to another embodiment of the subject matter described herein. In the embodiment illustrated in FIG. 6, the process includes receiving, at a smart device having at least one processor, sensor information from a tire-mounted sensor, the sensor being associated with a tire of a vehicle (step 1000), and monitoring a status of the tire (step 1002). A threshold condition is checked (step 1004), and if no threshold condition is found, the process returns to step 1000 and continues. If, at step 1004, a threshold condition is detected, the user is notified or alerted about the threshold condition (step 1006), and the process returns to step 1000 and continues.

Figure 7:
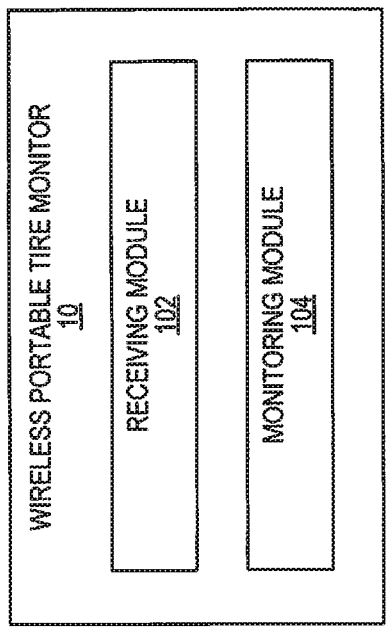
FIG. 7 is a block diagram illustrating an exemplary smart tire monitoring system according to another embodiment of the subject matter described herein.

FIG. 7 is a block diagram illustrating an exemplary smart tire monitoring system according to another embodiment of the subject matter described herein. In the embodiment illustrated in FIG. 7, the wireless portable tire monitor 10 includes a receiving module 102 operable to receive sensor information from a tire-mounted sensor, the sensor being associated with a tire of a vehicle, and a monitoring module 104 operable to monitor a status of the tire.

Figure 8A:
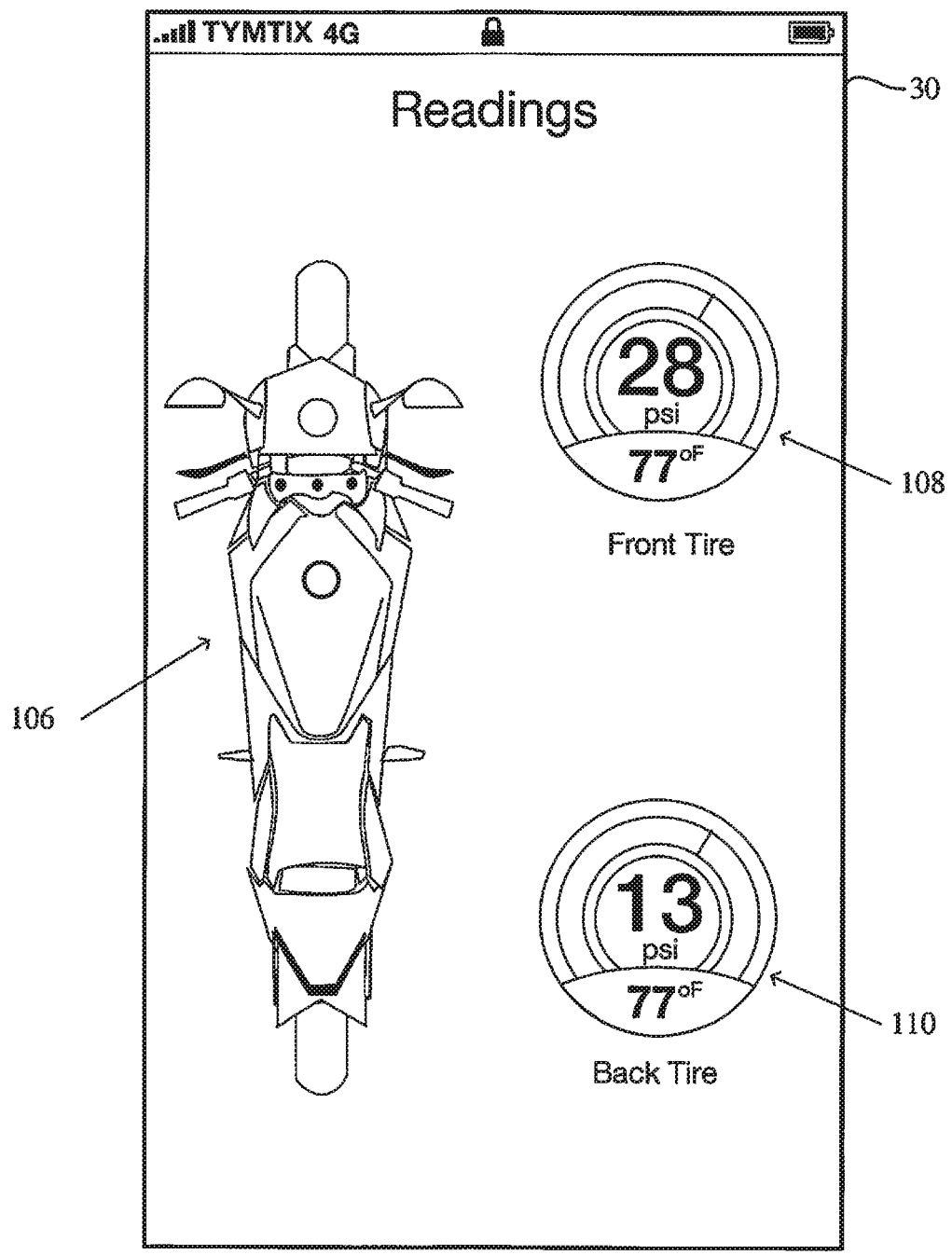
FIGS. 8A and 8B illustrate graphical displays of tire status according to other embodiments of the subject matter described herein.

FIG. 8A illustrates a graphical display of tire status according to an embodiment of the subject matter described herein. In the embodiment illustrated in FIG. 8A, the vehicle being displayed on Readings screen 30 is a motorcycle 106, which has only a front tire 108 and a back tire 110. FIG. 8A illustrates the point that the tire monitor 10 supports vehicles having any number of tires. The graphic image of the motorcycle in FIG. 8A contrasts with the graphic image of a passenger car in FIG. 4C, illustrating the point that the display can be configured to more clearly convey not only the position of the wheels on the vehicle but also the type of the vehicle itself, i.e., a motorcycle rather than a car. Other vehicle graphics are available for selection by the user. In one embodiment, the user may provide his or her own image for use as the representative graphic. For example, the user may take a photo of the vehicle to be used as the representative graphic.

Figure 8B:
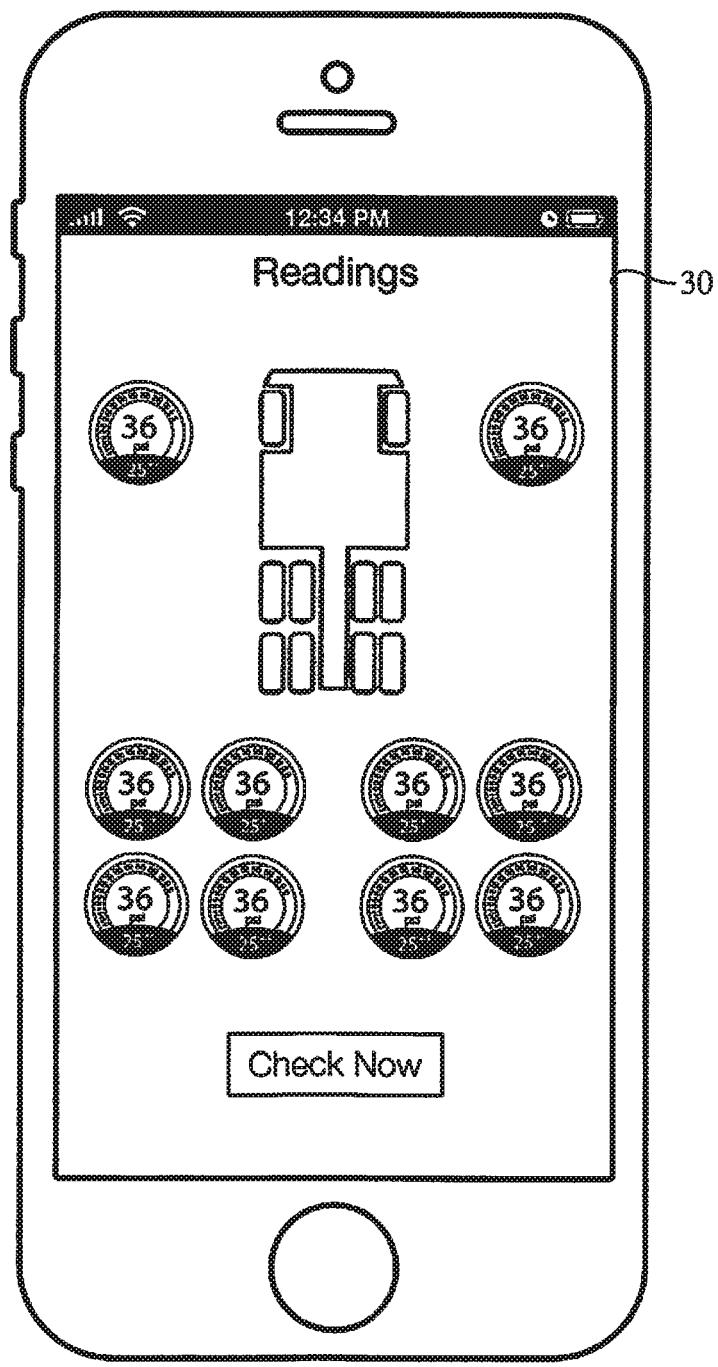

FIG. 8B illustrates a graphical display of tire status according to another embodiment of the subject matter described herein. In the embodiment illustrated in FIG. 8B, the vehicle being displayed on Readings screen 30 is a tractor of a tractor-trailer truck, also known as a semi. The graphic in the middle of the screen represents the top view of the tractor. A semi has two front tires and eight rear tires. The rear tires support a coupling by which a wheeled trailer is attached to the tractor. In one embodiment, the tractor may be configured as one vehicle and the trailer, which also typically has eight tires, may be configured as another vehicle. Additional trailers may be configured as additional vehicles. For example, the owner of a fleet of tractors and trailers may configure each tractor or trailer as an individual vehicle whose tire/sensor mappings may be stored in a company database and downloaded into one or more tire monitors 10 for use to monitor tire status at different geographic locations.

Figure 9:
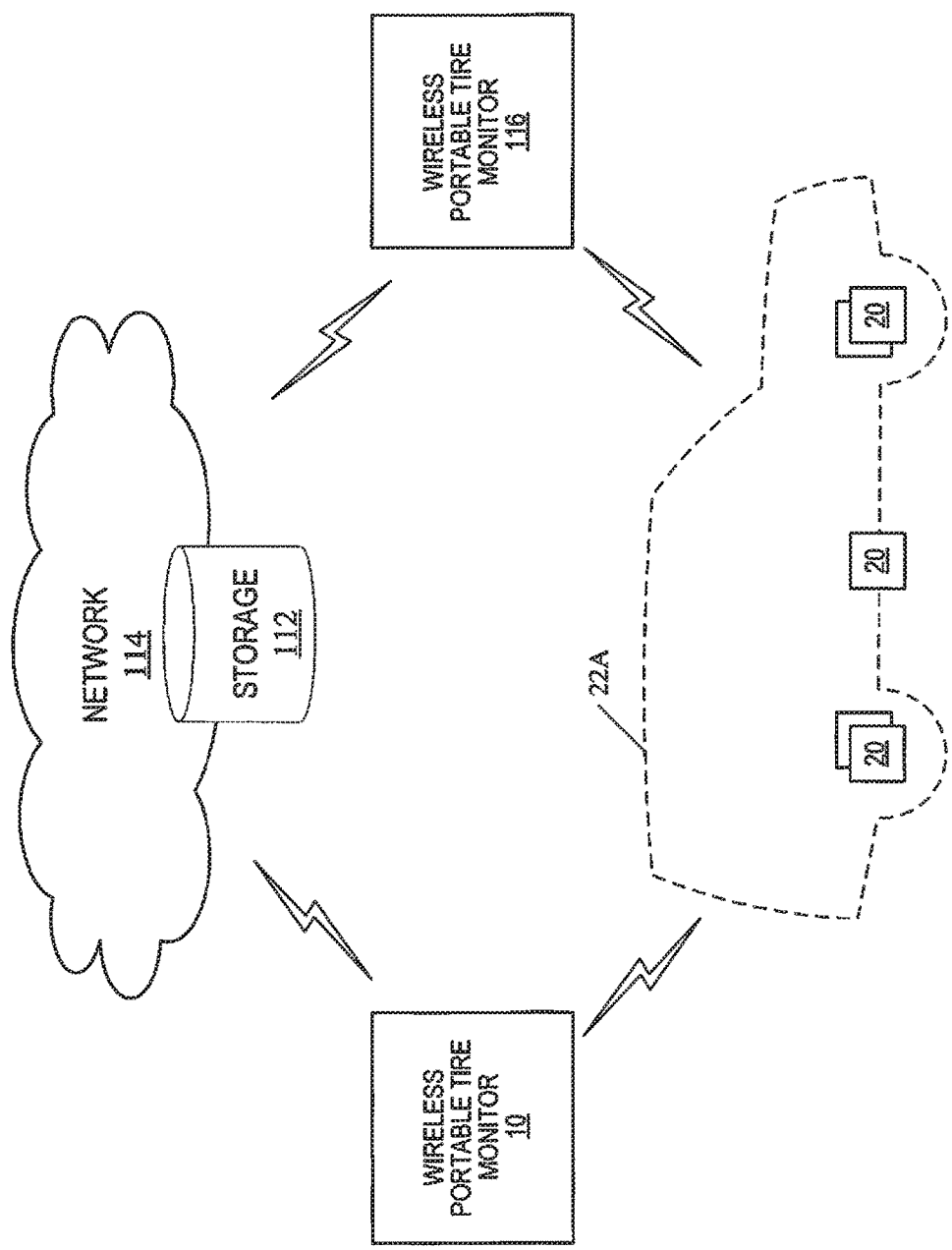
FIG. 9 illustrates an exemplary smart tire monitoring system according to another embodiment of the subject matter described herein.

FIG. 9 illustrates an exemplary smart tire monitoring system according to an embodiment of the subject matter described herein. In the embodiment illustrated in FIG. 9, the tire monitor 10 communicates with the sensors 20 on wheels of a vehicle 22A, and stores some of the information in storage 112 located in a communications network 114, e.g., "cloud storage." In one embodiment, various types of information may be stored locally to the tire monitor 10, remotely in cloud storage 112, both, or some combination of the above. Examples of such information include, but are not limited to, sensor calibration, sensor profiles, vehicle profiles, user profiles, sensor mappings, and sensor data. This has several advantages. If the tire monitor 10 is an application on a user's smart phone, cloud storage or backup of configuration and profile data means that if the smart phone is lost or damaged, or if the application is deleted and restored, the data can be restored from the cloud. Another advantage is that by making data available in the cloud, another wireless portable tire monitor 116 may be quickly configured to be able to monitor the same vehicle or vehicles 22 that the tire monitor 10 currently monitors.

The ability to connect to and communicate with the communications network 114 enables another type of notification. Since there's a chance that a user terminated the application or that the operating system put the application into deep sleep, it is possible that, in these scenarios, sensor data may never be read. To circumvent this situation, in one embodiment, data from the last successful reading of the sensors may be maintained in the cloud storage 112. In one embodiment, the tire monitor 10 may be configured to receive a push notification from the server saying it's time to check the tire pressure if the readings were not taken more than a week.

In one embodiment, a user may share their information to another user or to another device operated or managed by the same user or a different user. For example, a primary owner of a vehicle may want another member to access the vehicle sensor readings. FIGS. 10A through 10D are images of an exemplary user interface that illustrate the steps involved in sharing a vehicle configuration with another user of the system according to another embodiment of the subject matter described herein.

Figure 10B:
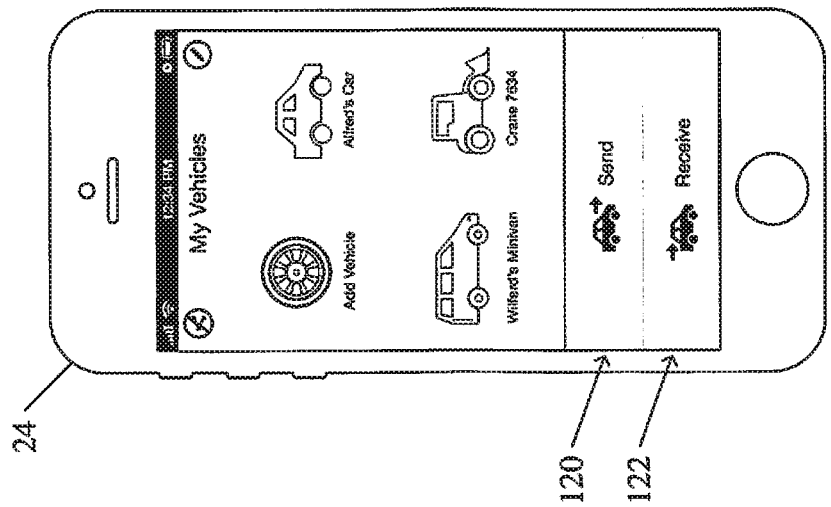
FIGS. 10A through 10D are images of an exemplary user interface that illustrate the steps involved in sharing a vehicle configuration with another user of the system according to another embodiment of the subject matter described herein.
Figure 10A:
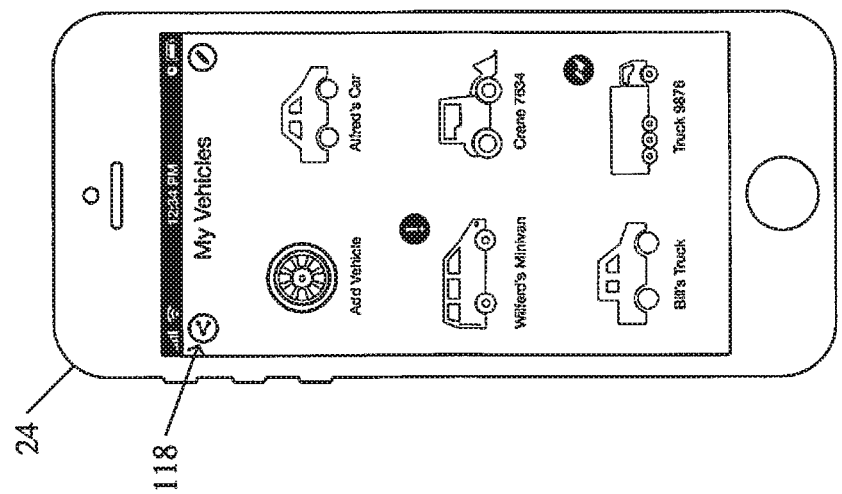

In the embodiment illustrated in FIG. 10A, the user may touch a share button 118 to initiate sharing of information with another tire monitor. In one embodiment, doing so will bring up a sharing dialog box, such as that which is shown in FIG. 10B.

In the embodiment illustrated in FIG. 10B, the user is presented with a Send button 120 and a Receive button 122. The Send button 120 is used to transfer information, such as vehicle/sensor configuration, from the smart phone application 24 of a first user to a second user. The Receive button 122 is used to transfer such information from another user to the smart phone application 24 of the first user. In one embodiment, when the user taps the Send button 120, the tire monitor 10 will prompt the user to select which vehicles' information is to be sent, such as that which is shown in FIG. 10C.

Figure 10D:
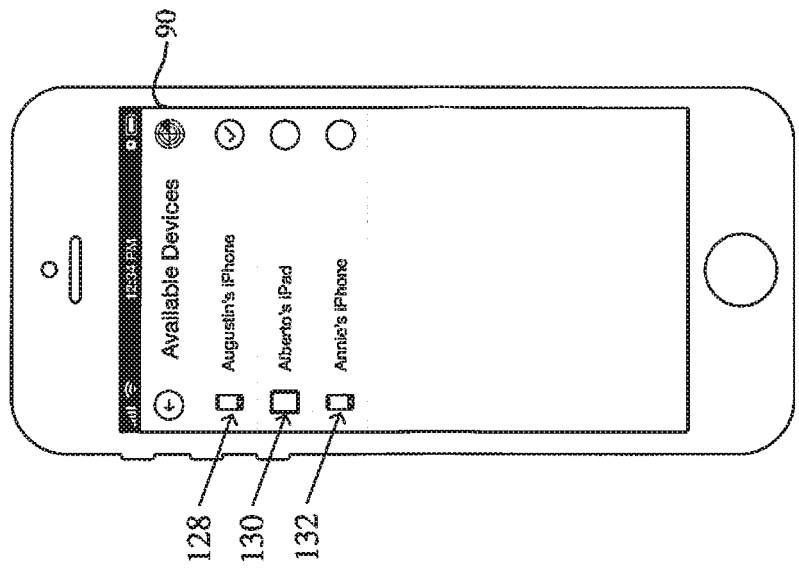
Figure 10C:
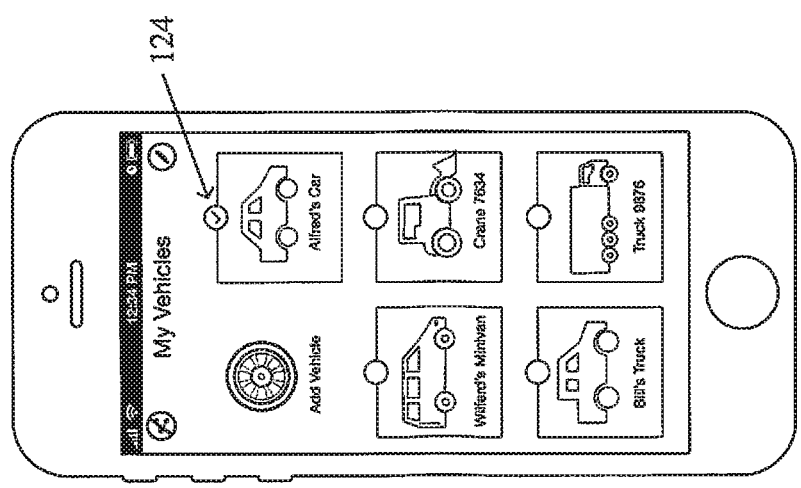

In the embodiment illustrated in FIG. 10C, the user has elected to transfer information about Alfred's Car, indicated by a check mark 124 in the circle above the Alfred's Car icon. Once a vehicle is selected, the user will be presented with a list of devices to which that information may be sent, such as that which is shown in FIG. 10D.

In the embodiment illustrated in FIG. 10D, an Available Devices screen 126 is displayed, showing that are three available devices to which the information may be sent: Augustin's iPhone 128, Alberto's iPad 130, and Annie's iPhone 132. In the embodiment illustrated in FIG. 10D, Augustin's iPhone 128 has been selected as the recipient of the data. In one embodiment, sharing information with another user may allow that user to be able to directly measure and/or monitor a particular vehicle. In one embodiment, the user with whom data has been shared may also have access to copies of the information stored in the cloud. In alternative embodiments, the user may select a vehicle (or vehicles) before hitting the Send button 120.

Although the examples described above relate to monitoring of tire pressure, tire temperature, etc., the same concepts may be applied to remotely monitor other things, such as oil pressure and temperature, transmission fluid pressure and temperature, coolant pressure and temperature, and so on. Likewise, the same concepts may be applied to monitor other types of vehicles, such as boats, airplanes, etc.

Those skilled in the art will recognize improvements and modifications to the preferred embodiments of the present invention. All such improvements and modifications are considered within the scope of the concepts disclosed herein and the claims that follow.

Embodiments

The following are example embodiments of a smart tire pressure monitoring system. The following embodiments are for illustrative purposes and are not intended to be limiting. Other embodiments within the scope of the concepts described herein are contemplated.

1. A smart tire pressure monitoring system comprising sensor based hardware and a mobile application running on a smartphone or tablet to check and monitor tire pressure and temperature inside one or more tires wirelessly without being inside of a vehicle and without turning on a vehicle's power.

2. The smart tire pressure monitoring system of embodiment 1 including an asynchronous notification feature to alert a user without any user involvement if one or more monitored tire is flat or is below or above a certain threshold of manufacturer recommended pressure.

3. The smart tire pressure monitoring system of embodiment 1 wherein the application is used as a one single place to track all vehicles whose tires need to be monitored for pressure and temperature.

4. The smart tire pressure monitoring system of embodiments 1 and 3 wherein a vehicle can be added or removed at any time to or from the system dynamically.

5. The smart tire pressure monitoring system of embodiments 1, 3, and 4 wherein the number of tires to be monitored in a vehicle can be added or removed at any time dynamically.

6. A smart tire pressure monitoring system substantially as herein described with reference to the accompanying drawings.

What is claimed is:

1. A method of operation of a wireless portable tire monitoring system, the method comprising:
   at a wireless portable tire monitor having at least one processor and a memory for storing sensor mappings and vehicle profiles:
      receiving sensor information from one or more tire-mounted sensors, each sensor being associated with a tire according to a sensor mapping, and each tire and associated sensor being associated with a vehicle according to a vehicle profile; and
      monitoring a status of at least one of the one or more tires.

2. The method of claim 1 wherein the sensor information is received from a plurality of vehicles according to each vehicle's respective vehicle profile.

3. The method of claim 1 wherein each tire can be dynamically associated with or disassociated from a particular vehicle.

4. The method of claim 1 wherein receiving the sensor information comprises receiving at least one of:
   an inflation pressure of the tire;
   a temperature of the tire;
   an indication of rotation of the tire; and
   an indication of vibration of the tire.

5. The method of claim 1 wherein monitoring a status comprises making the tire status available for viewing by the user of the wireless portable tire monitoring system comprises providing a graphic association between the tire status and the vehicle with which the tire is associated and graphically representing a location or position of the tire on or relative to the vehicle.

6. The method of claim 1 wherein monitoring the status of the tire comprises:
   determining whether the sensor information indicates a threshold condition, the threshold condition comprising that at least one of: a tire pressure is above or below a pressure threshold; a tire temperature is above or below a temperature threshold; a tire rotation is above or below a rotation rate threshold; and a tire vibration is above or below a vibration threshold; and upon determination that the sensor information indicates the threshold condition, performing an action.

7. The method of claim 6 wherein performing an action comprises providing an alert or notification to a user of the wireless portable tire monitoring system.

8. A wireless portable tire monitor, comprising:
a wireless transceiver;
a display device;
one or more processors; and
memory storing instructions executable by the one or more processors, whereby the wireless portable tire monitor is operable to:
receive sensor information from one or more tire-mounted sensors, each sensor being associated with a tire according to a sensor mapping stored in memory, and each tire and associated sensor being associated with a vehicle according to a vehicle profile stored in memory; and
monitor a status of at least one of the one or more tires.

9. The wireless portable tire monitor of claim 8 wherein the sensor information is received from a plurality of vehicles according to each vehicle's respective vehicle profile.

10. The wireless portable tire monitor of claim 8 wherein each tire can be dynamically associated with or disassociated from a particular vehicle.

11. The wireless portable tire monitor of claim 8 wherein receiving the sensor information comprises receiving at least one of:
an inflation pressure of the tire;
a temperature of the tire;
an indication of rotation of the tire; and
an indication of vibration of the tire.

12. The wireless portable tire monitor of claim 8 wherein monitoring the status comprises making the tire status available for viewing by the user of the wireless portable tire monitor comprises providing a graphic association between the tire status and the vehicle to which the tire is associated and graphically representing a location or position of the tire on or relative to the vehicle.

13. The wireless portable tire monitor of claim 8 wherein monitoring a status of the tire comprises:
determining whether the sensor information indicates a threshold condition, the threshold condition comprising that at least one of: a tire pressure is above or below a pressure threshold; a tire temperature is above or below a temperature threshold; a tire rotation is above or below a rotation rate threshold; and a tire vibration is above or below a vibration threshold; and
upon a determination that the sensor information indicates a threshold condition, performing an action.

14. The wireless portable tire monitor of claim 13 wherein performing an action comprises providing an alert or notification to a user of the wireless portable tire monitor.

15. A non-transitory computer readable medium storing software instructions that, when executed by one or more processors of a wireless portable tire monitor, cause the wireless portable tire monitor to:
receive sensor information from one or more tire-mounted sensors, each sensor being associated with a tire according to a sensor mapping stored in memory, and each tire and associated sensor being associated with a vehicle according to a vehicle profile stored in memory; and
monitor a status of at least one of the one or more tires.

* * * * *